United States Patent [19]

McDaid

[11] Patent Number: 4,964,284

[45] Date of Patent: Oct. 23, 1990

[54] TELEPHONE LOCK

[76] Inventor: Denis McDaid, 25 O'Connor Court, Ballymagroarty, Derry, Ireland

[21] Appl. No.: 451,216

[22] Filed: Dec. 15, 1989

[30] Foreign Application Priority Data

Oct. 16, 1989 [IE] Ireland .................................. 3328/89

[51] Int. Cl.⁵ ............................................. E05B 73/00
[52] U.S. Cl. ........................................... 70/14; 70/57; 70/DIG. 72; 439/133
[58] Field of Search ....................................... 70/57–58, 70/14, DIG. 72; 439/133; 379/443, 445

[56] References Cited

U.S. PATENT DOCUMENTS 4,311,883  1/1982  Kidney ..................................... 70/57
4,846,708  7/1989  Marson .................................. 439/133
4,862,500  8/1989  May ....................................... 379/445
4,870,840 10/1989  Klein ....................................... 70/57

Primary Examiner—Robert L. Wolfe
Attorney, Agent, or Firm—Curtis, Morris & Safford

[57] ABSTRACT

A telephone lock for preventing the plug of a telephone from being inserted into a corresponding line jack unit comprises a locking means including a shank member of a suitable length and size to be accommodated in the socket of a line jack unit in substitution for a telephone plug proper. The shank member has a movable locking member mounted thereon which is arranged to be in use moved by the locking means to engage a part of the line jack unit socket to prevent removal of the telephone lock from the line jack unit.

5 Claims, 4 Drawing Sheets

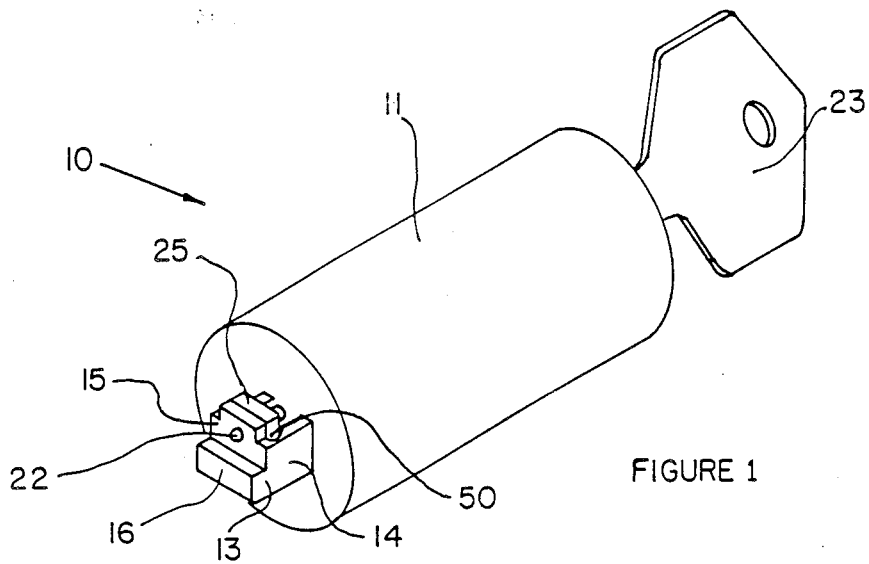
FIGURE 1
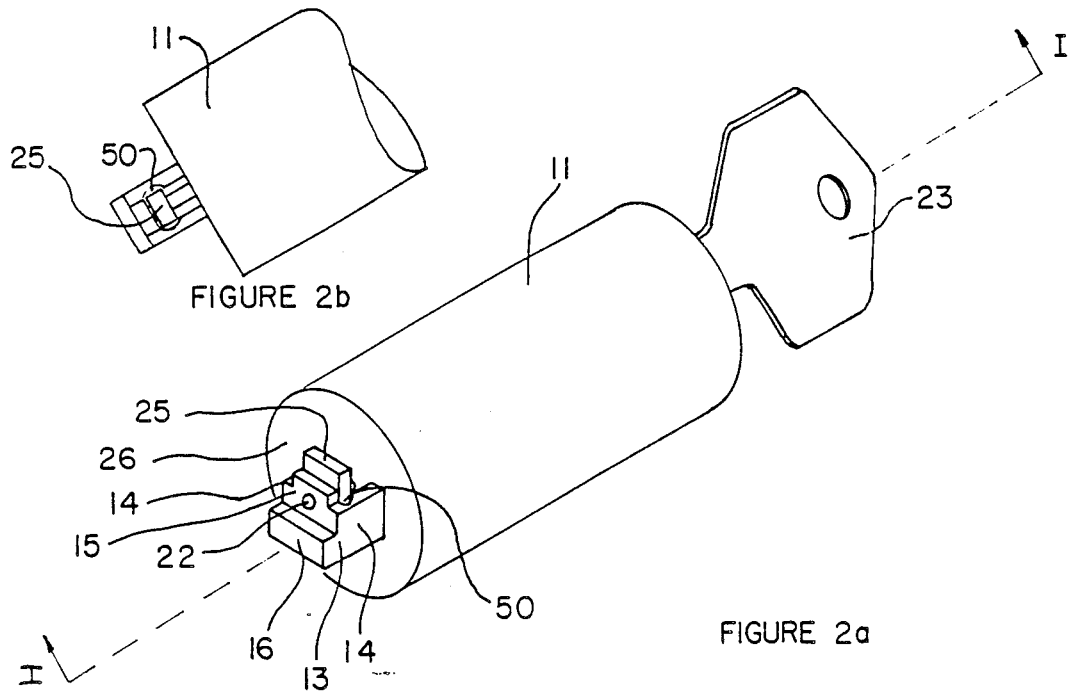
FIGURE 2b
FIGURE 2a

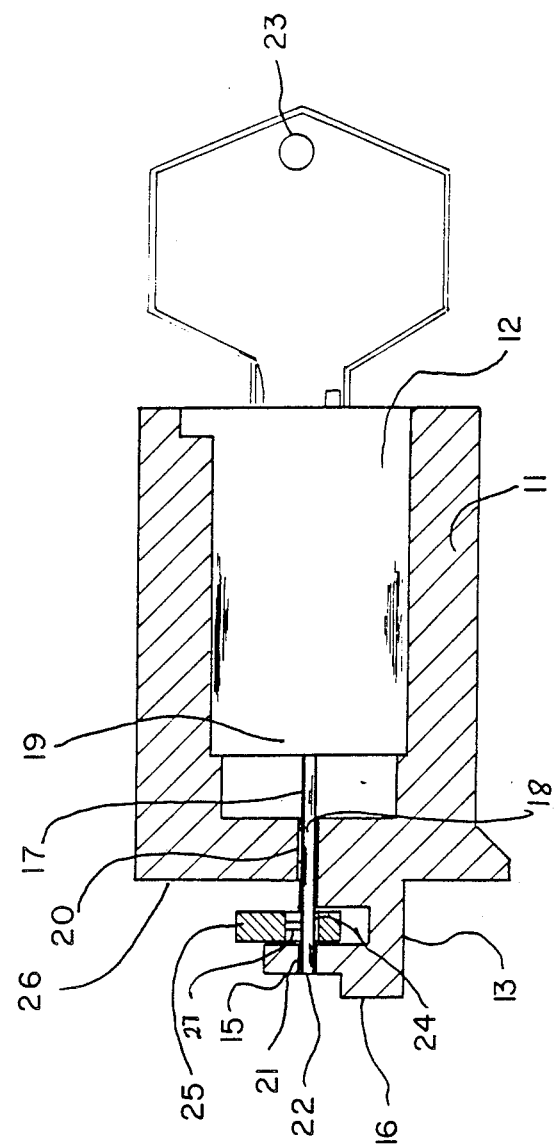

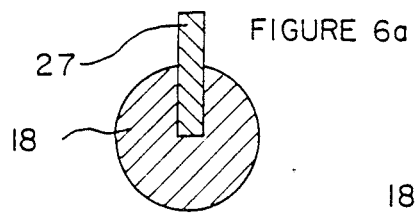
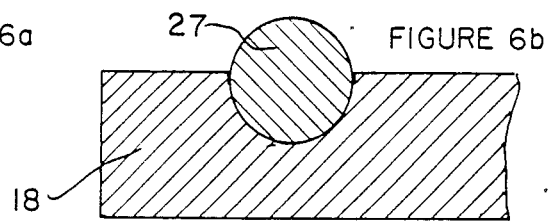
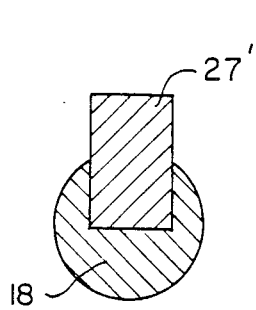
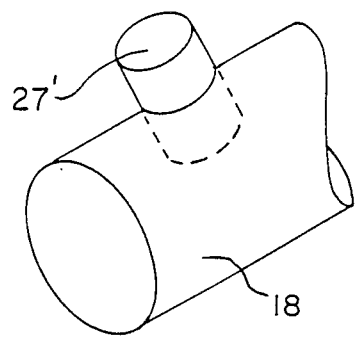
FIGURE 7a					FIGURE 7b
FIGURE 8a					FIGURE 8b
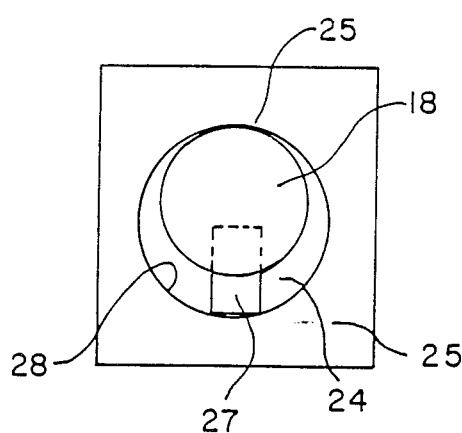
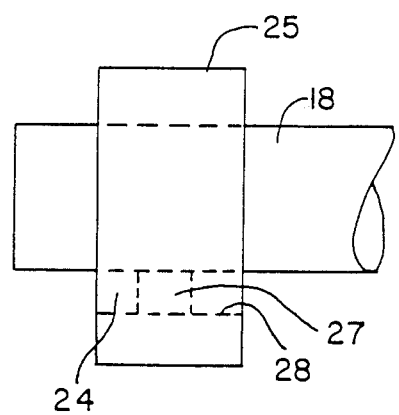

TELEPHONE LOCK

The present invention relates to a telephone lock, and in particular a lock which prevents the plug of a telephone from being inserted into a line jack unit.

It is now common for telephones to have a cable which terminates in a plug, this plug being inserted into a socket in a line jack unit which is normally fixed to a wall or other structure in a room. The line jack unit is a conventional apparatus which includes a socket into which the telephone plug is inserted to connect the telephone to a telephone line.

An object of the present invention is to provide a telephone lock which prevents the plug of a telephone from being inserted into a corresponding line jack unit.

According to the invention there is provided a telephone lock for preventing the plug of a telephone from being inserted into a corresponding line jack unit, comprising a locking means including a shank member of a suitable length and size to be accommodated in the socket of the line jack unit in substitution for the telephone plug proper, the shank member having a movable locking member mounted thereon and arranged to be in use moved by the locking means to engage a part of the line jack unit socket to prevent removal of the telephone lock from the line jack unit.

Preferably, the locking means comprises a key operated barrel lock having a pin which projects outwardly towards the shank member. The locking member preferably comprises a latch plate having an aperture through which the pin projects, said pin having cam means in the region of the aperture which cooperates with the latch plate to move the latch plate in a direction substantially perpendicular to the axis of the pin.

An embodiment of the invention will now be described, by way of example, with reference to the accompanying drawings, in which;

FIG. 1 is a perspective view of a telephone lock according to the invention;

FIG 2a is a perspective view of the telephone lock of FIG. 1 with the locking plate in a locking position;

FIG. 2b is a plan view of the shank member of the telephone lock of FIG. 2a;

FIG. 3 is a cross-sectional view of the telephone lock taken along the lines I—I in FIG. 2;

FIGS. 6a and 6b are front and side views respectively of one embodiment of the pin and cam means;

FIGS. 7a and 7b are front and side views of another embodiment of pin and cam means; and FIGS. 8a and 8b are front and side views respectively showing the pin and cam means cooperating with the latch plate.

Figure 4:
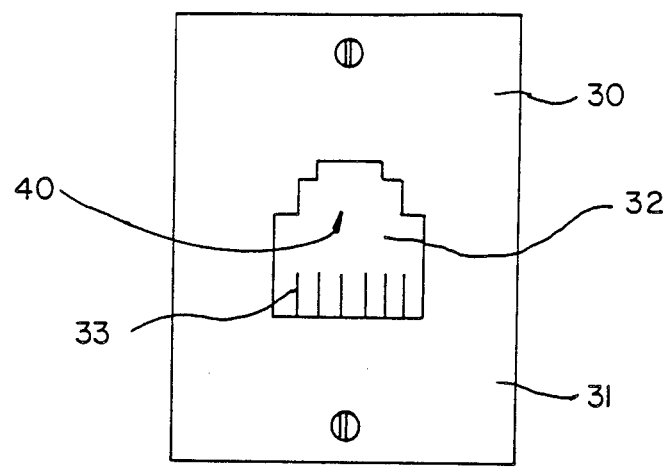
FIG. 4 is a front view of a typical line jack unit into which the telephone lock is located.

Referring now to the drawings wherein similar numerals have been used to indicate like parts there is shown therein a telephone lock generally indicated at 10 according to the invention. The telephone lock 10 comprises a housing 11 in which is fixed a conventional barrel lock 12. The housing 11 includes a shank member 13 integrally formed with the housing 11 and which extends outwardly from the housing 11. The shank 13 includes sidewalls 14 and a stepped end wall comprising upper and loWer end wall parts 15, 16 respectively. One end 17 of an elongate rotatable pin 18 is connected to the operating mechanism 19 of the barrel lock 12, and extends outwardly through an aperture 20 in the housing 11 the end 21 of the pin 18 being accommodated in an aperture 22 in the upper wall part 15. The pin 18 is rotated through 180° when the barrel lock 12 is operated by a suitable key 23.

The pin 18 also passes through an aperture 24 in a latch plate 25 which is located on the pin 18 between the upper wall part 15 and the end 26 of the housing 11. In the region of the aperture 24, the pin has formed thereon a cam member 27 which engages the surface 28 of the latch plate 25 defining the aperture 24. Thus, the aperture 24 is of a greater diameter than that of the pin 18. The cam member 27 as shown in FIGS. 6a and 6b, is generally semi-circular. Alternatively, the cam member may be cylindrical as indicated at 27' in FIGS. 7a and 7b. Thus, as the pin 18 is rotated by operating key 23, the cam member 27 engages the latch plate 25 and moves it from its lower position (FIG. 1) to a raised position as shown in FIG. 2a in which at least a portion of the latch plate projects above the end wall 15 of the shank.

The latch plate 25 is located in position by and slides in a pair of vertical recesses 50 in the sidewalls 14 of the shank 13.

Figure 5:
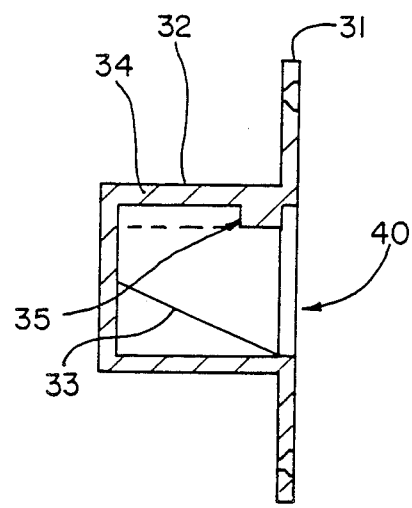
FIG. 5 is a sectional view of the line jack unit of FIG. 4.

In FIGS. 4 and 5 there is shown one type of a telephone line jack unit 30. The unit 30 comprises a housing 31 having a socket 32 into which in normal use a conventional telephone plug (not shown) is inserted to connect a telephone line. The socket 32 has electrical contacts 33 located therein which mate with corresponding contacts on the telephone plug. As shown, the upper wall 34 of the socket 32 has a shoulder 35 which as will be described below enables the telephone lock 10 to be secured in position.

In use, the shank 13 of the telephone lock 10 is inserted into the socket 32 of the line jack unit 30, in substitution for a telephone plug proper. It will be noted that the shank 13 of the telephone lock 10 is shaped to generally correspond to the shape of the opening 40 of the socket 32

The latch plate 25 is then moved to its raised position by rotating the key 23 to operate the barrel lock 12, so that the latch plate 25 engages behind the shoulder 35 and the telephone lock 10 is secured in position and cannot be removed. To remove the lock 10 from the line jack unit the barrel lock 12 is simply operated again to rotate the latch plate to its lowered position and the telephone lock lo is then removed from the socket 32.

The main advantage of the invention is that it is simple to operate requiring only the removal of the conventional telephone plug. In addition, the telephone lock is inexpensive to manufacture.

I claim:

1. A telephone lock for preventing the plug of a telephone from being inserted into a corresponding line jack unit, comprising a locking means including a shank member of a suitable length and size to be accommodated in a socket of the line jack unit in substitution for a telephone plug proper, a movable latch plate mounted adjacent to a free end of the shank member, the latch plate being connected to the locking means by an elongate rotatable pin which passes through an aperture in the latch plate, such that upon operation of the locking means, the latch plate is movable between a lower position and a raised or locking position, and when in the raised or locking position at least a portion of the latch plate projects above an end wall of the shank member and engages a part of the line jack unit socket to prevent removal of the telephone lock from the line jack unit.

2. A telephone lock as claimed in claim 1, wherein the pin has a cam means disposed on the pin in the region of the aperture in the latch plate, the cam means cooperating with the latch plate during rotation of the pin to move the latch plate between its two positions.

3. A telephone lock as claimed in claim 1, wherein the latch plate is located in a pair of recesses defined in sidewalls of the shank member.

4. A telephone lock as claimed in claim 1 wherein the locking means comprises a key operated barrel lock.

5. A telephone lock as claimed in claim 4 wherein the barrel lock is fixed in a housing.

* * * * *